(12) United States Patent
Fujino et al.

(10) Patent No.: US 10,260,609 B2
(45) Date of Patent: Apr. 16, 2019

(54) FLUID TRANSMISSION DEVICE

(71) Applicant: YUTAKA GIKEN CO., LTD., Hamamatsu-shi, Shizuoka (JP)

(72) Inventors: Kenji Fujino, Hamamatsu (JP); Yoshihisa Sugimura, Hamamatsu (JP)

(73) Assignee: Yutaka Giken Co., Ltd., Shizuoka, Japa ( * ) Notice: Subject to any disclaimer, the term of this patent is extended or adjusted under 35 U.S.C. 154(b) by 78 days.

(21) Appl. No.: 15/463,153

(22) Filed: Mar. 20, 2017

(65) Prior Publication Data

US 2017/0299030 A1 Oct. 19, 2017

(30) Foreign Application Priority Data

Apr. 15, 2016 (JP) ................................. 2016-082155

(51) Int. Cl.
| | |
|---|---|
| *F16H 41/28* | (2006.01) |
| *F16F 15/34* | (2006.01) |
| *F16D 33/18* | (2006.01) |
| *F16H 45/02* | (2006.01) |

(52) U.S. Cl.
CPC .............. *F16H 41/28* (2013.01); *F16D 33/18* (2013.01); *F16F 15/34* (2013.01); *F16H 45/02* (2013.01); *F16H 2045/0278* (2013.01)

(58) Field of Classification Search
CPC .......... F16H 41/24; F16H 41/28; F16D 33/18; F16D 33/20
USPC ........................................................ 60/367
See application file for complete search history.

(56) References Cited

U.S. PATENT DOCUMENTS

| | | | | |
|---|---|---|---|---|
| 2,182,394 | A * | 12/1939 | Bucy ...................... | F16D 33/06 60/338 |
| 2,287,532 | A * | 6/1942 | Patterson ................ | F16H 41/24 60/338 |
| 2,357,295 | A * | 9/1944 | Thompson .............. | F16D 33/20 29/889.5 |
| 3,152,447 | A * | 10/1964 | Waclawek .............. | F16H 41/28 60/362 |
| 4,780,593 | A * | 10/1988 | Kato ....................... | B23K 9/04 219/125.1 |

(Continued)

FOREIGN PATENT DOCUMENTS

| | | | |
|---|---|---|---|
| JP | 06323396 | A * | 11/1994 |
| JP | 2001-116109 | A | 4/2001 |

OTHER PUBLICATIONS

JPH06323396 A machine translation to English from espacenet. 1994.*

*Primary Examiner* — Michael Leslie
*Assistant Examiner* — Michael Quandt
(74) *Attorney, Agent, or Firm* — Carrier Blackman & Associates, P.C.; Joseph P. Carrier; Fulchand P. Shende

(57) ABSTRACT

In a fluid transmission device in which a core is fixed to inner ends of a plurality of blades so as to form, together with a bowl-shaped shell and the blades, an impeller, the core including a plurality of latching holes with which a projecting piece projectingly provided at the inner end of the blade is latched and including a balance weight chip welded to the core, the balance weight chip includes a projecting piece-avoiding hole through which a portion, projecting from the latching hole, of the projecting piece extends, the balance weight chip being welded to the core with a whole of the balance weight chip in intimate contact with the core.

2 Claims, 4 Drawing Sheets

(56) References Cited

U.S. PATENT DOCUMENTS 5,278,391 A * 1/1994 Yakami ............... B23K 9/044
219/137 R

* cited by examiner

FLUID TRANSMISSION DEVICE

BACKGROUND OF THE INVENTION

Field of the Invention

The present invention relates to a fluid transmission device comprising a bowl-shaped shell, a plurality of blades that are arranged along a peripheral direction of the shell and fixed to an inner peripheral face of the shell, and a core that is fixed to an inner end of the blade so as to form, together with the shell and the blades, an impeller, the core comprising a plurality of latching holes with which a projecting piece projectingly provided at the inner end of the blade is latched and comprising a balance weight chip welded to the core.

Description of the Related Art

Such a fluid transmission device is known from Japanese Patent Application Laid-open No. 2001-116109; in this arrangement, in order to weld a balance weight chip to a core while avoiding a portion, projecting from a latching hole, of a projecting piece that is projectingly provided at an inner end of a blade and is latched into the latching hole of the core, a portion projecting toward the core is formed on part of the balance weight chip, and this projecting portion is welded to the core.

However, in the arrangement disclosed in Japanese Patent Application Laid-open No. 2001-116109, a gap for avoiding the portion, projecting from the latching hole, of the projecting piece occurs between the core and the balance weight chip, and not only do dimensions of the fluid transmission device increase, but it is also difficult to carry out positioning of the balance weight chip when welding the balance weight chip to the core, and there is a possibility that the balance weight chip will interfere with another component during assembly.

SUMMARY OF THE INVENTION

The present invention has been accomplished in light of such circumstances, and it is an object thereof to provide a fluid transmission device that enables dimensions to be reduced by minimizing a space for placing a balance weight chip while enabling reliable positioning of the balance weight chip with respect to a core.

In order to achieve the object, according to a first aspect of the present invention, there is provided a fluid transmission device comprising a bowl-shaped shell, a plurality of blades that are arranged along a peripheral direction of the shell and fixed to an inner peripheral face of the shell, and a core that is fixed to an inner end of the blade so as to form, together with the shell and the blades, an impeller, the core comprising a plurality of latching holes with which a projecting piece projectingly provided at the inner end of the blade is latched and comprising a balance weight chip welded to the core, wherein the balance weight chip comprises a projecting piece-avoiding hole through which a portion, projecting from the latching hole, of the projecting piece extends, the balance weight chip being welded to the core with a whole of the balance weight chip in intimate contact with the core.

In accordance with the first aspect, due to the portion, projecting from the latching hole, of the projecting piece projectingly provided at the inner end of the blade extending through the projecting piece-avoiding hole provided in the balance weight chip, it is possible to make the whole of the balance weight chip be in intimate contact with the core and be welded to the core, a small size for the fluid transmission device can therefore be achieved by enabling the balance weight chip to be welded to the core while preventing a gap from being formed between itself and the core and, furthermore, due to the portion, projecting from the latching hole, of the projecting piece extending through the projecting piece-avoiding hole it becomes possible to carry out reliable positioning of the balance weight chip with respect to the core, thus preventing the balance weight chip from interfering with another component.

According to a second aspect of the present invention, in addition to the first aspect, an inner peripheral part or an outer peripheral part of the balance weight chip having a plurality of the projecting piece-avoiding holes and extending in a peripheral direction of the core comprises a plurality of cutouts disposed so as to correspond to positions between the plurality of projecting piece-avoiding holes, and the balance weight chip is welded to the core so that a welded part is disposed within the cutout.

In accordance with the second aspect, since the balance weight chip is welded to the core so that the welded part is disposed within the cutout provided in the inner peripheral part or the outer peripheral part of the balance weight chip, it is possible to reduce the space on the core necessary for disposing the balance weight chip while ensuring that the welded part does not project outward in the width direction of the balance weight chip.

According to a third aspect of the present invention, in addition to the second aspect, among three or more of the cutouts provided in the balance weight chip, including specific cutouts disposed at opposite ends in a longitudinal direction of the balance weight chip, a cutout other than the specific cutout is formed into a semicircular shape, and the specific cutout is formed into a ¼ circle shape so as to form a semicircular shape in cooperation with the specific cutout of another balance weight chip.

In accordance with the third aspect, since the specific cutout disposed at opposite ends in the longitudinal direction of the balance weight chip is formed into a ¼ circle shape and forms a semicircular shape in cooperation with the specific cutout of another balance weight chip, it is possible to enable end parts of adjacent balance weight chips to be welded to each other at the same time, thus reducing the number of welding positions.

Note that a turbine runner 6 of an embodiment corresponds to the impeller of the present invention, a turbine shell 10 of the embodiment corresponds to the shell of the present invention, a turbine blade 11 of the embodiment corresponds to the blade of the present invention, and a turbine core 12 of the embodiment corresponds to the core of the present invention.

The above and other objects, characteristics and advantages of the present invention will be clear from detailed descriptions of the preferred embodiment which will be provided below while referring to the attached drawings.

DESCRIPTION OF THE PREFERRED EMBODIMENT

Figure 1:
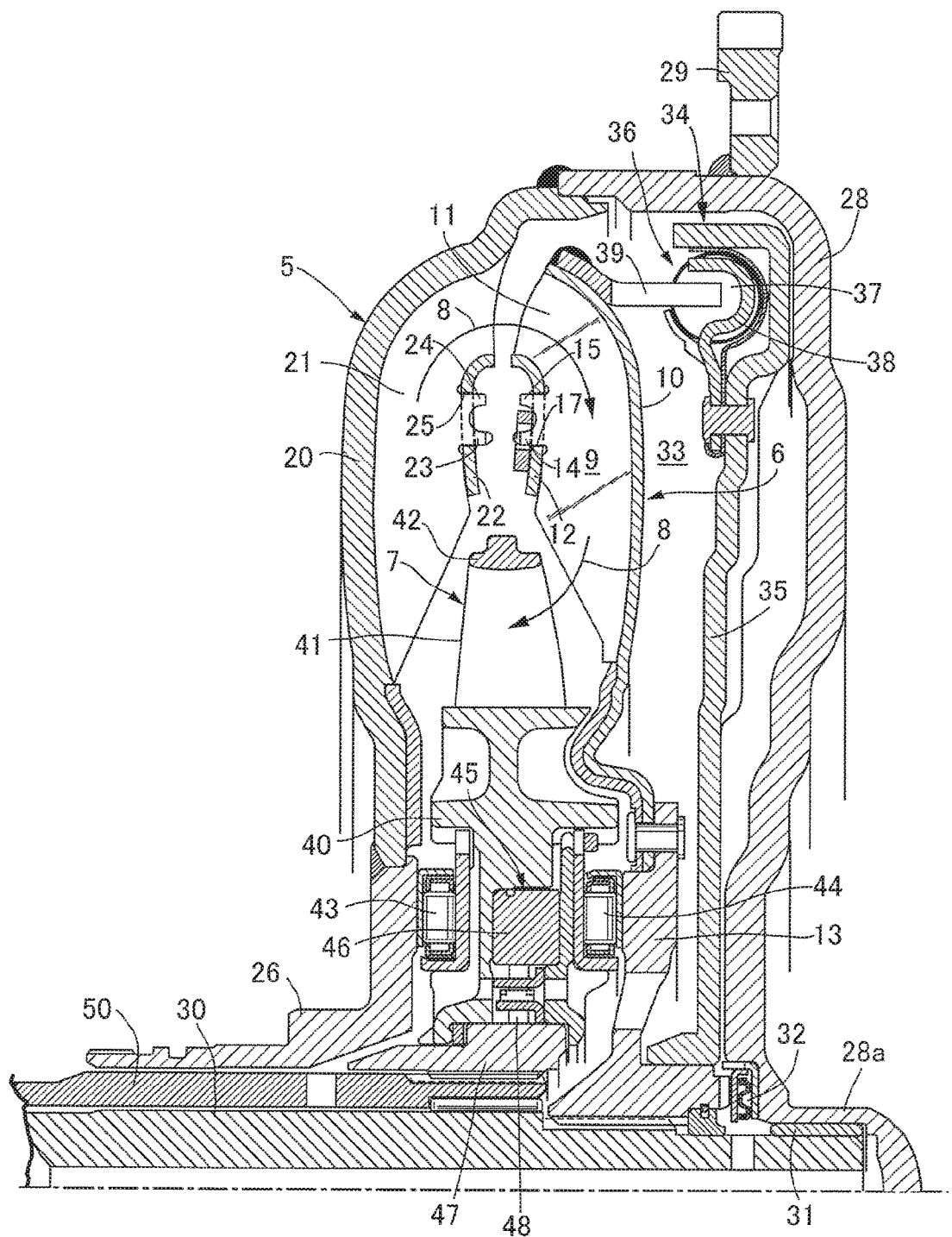
FIG. 1 is a longitudinal sectional view of a torque converter.

An embodiment of the present invention is explained below by reference to the attached FIG. 1 to FIG. 4; first, in FIG. 1, this fluid transmission device is a torque converter and includes a pump impeller 5, a turbine runner 6 disposed so as to oppose the pump impeller 5, and a stator 7 disposed between inner peripheral parts of the pump impeller 5 and the turbine runner 6, and a circulation circuit 9 is formed between the pump impeller 5, the turbine runner 6, and the stator 7, hydraulic oil being circulated through the circulation circuit 9 as shown by arrow 8.

Figure 2:
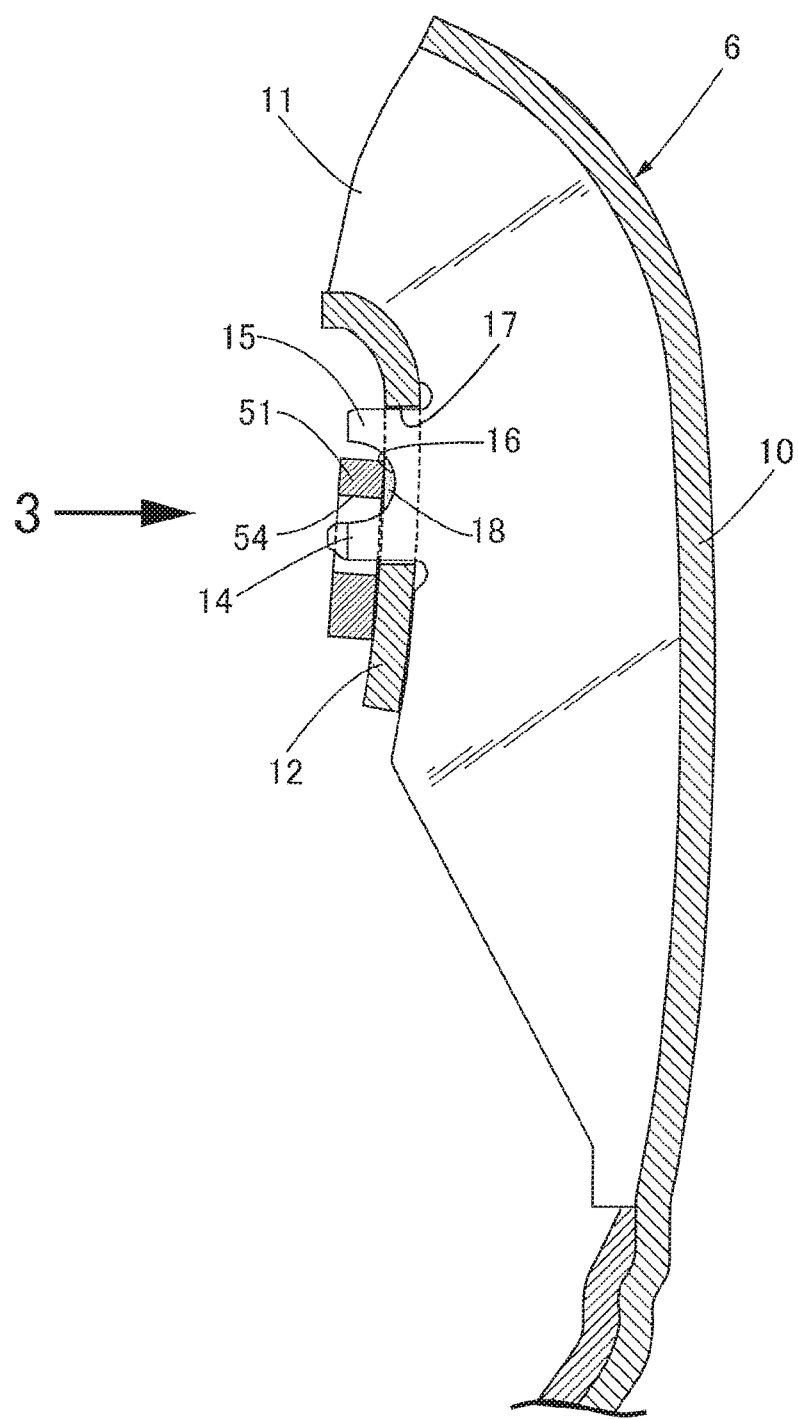
FIG. 2 is a longitudinal sectional view of an essential part of a turbine runner.

Referring in addition to FIG. 2, the turbine runner 6 includes a bowl-shaped turbine shell 10, a plurality of turbine blades 11 arranged along the peripheral direction of the turbine shell 10 and fixed by brazing to an inner peripheral face of the turbine shell 10, and a ring-shaped turbine core 12 fixed by brazing to the inner end of the turbine blades 11, a turbine hub 13 being fixed to an inner peripheral part of the turbine shell 10.

A pair of projecting pieces 14 and 15 arranged at intervals in the longitudinal direction are projectingly and integrally provided with the inner end of the turbine blade 11 so as to form a valley part 16 between the projecting pieces 14 and 15, and the turbine core 12 is provided with a plurality of latching holes 17, the projecting pieces 14 and 15 being loosely inserted through the latching holes 17.

Among the pair of projecting pieces 14 and 15, one projecting piece 14 is formed so as to be longer than the other projecting piece 15; bending a portion, projecting from the latching hole 17, of said one projecting piece 14 puts the turbine blade 11 and the turbine core 12 into a provisionally latched state, and by placing a brazing material in a gap between the projecting pieces 14 and 15 from the latching hole 17 and heating in this state the inner end of the turbine blade 11 is brazed to the turbine core 12. In this process, the bottom of the valley part 16 between the projecting pieces 14 and 15 is present within the latching hole 17, molten brazing material 18 remains in the valley part 16, the brazing material 18 therefore reliably penetrates into a gap between the projecting pieces 14 and 15 and an inside wall of the latching hole 17, and the inner ends of the plurality of turbine blades 11 are fixed to the turbine core 12.

Referring again to FIG. 1, the pump impeller 5 includes a bowl-shaped pump shell 20, a plurality of pump blades 21 arranged in the peripheral direction of the pump shell 20 and fixed by brazing to an inner peripheral face of the pump shell 20, and a ring-shaped pump core 22 fixed by brazing to the inner ends of the pump blades 21.

A pair of projecting pieces 23 and 24 arranged at intervals in the longitudinal direction are projectingly and integrally provided with the inner end of the pump blade 21, a plurality of latching holes 25 are provided in the pump core 22, the projecting pieces 23 and 24 being loosely inserted through the latching holes 25, and the inner end of the pump blade 21 is brazed to the pump core 22 with a structure that is the same as the structure with which the turbine blade 11 and the turbine core 12 are brazed.

A pump hub 26 is welded to an inner peripheral part of the pump shell 20, the pump hub 26 being disposed at a position spaced in the axial direction from the turbine hub 13, and an oil pump (not illustrated) for supplying hydraulic oil to the torque converter is operatively linked to the pump hub 26.

Furthermore, a side cover 28 covering the turbine runner 6 from the outside is fixed by welding to an outer peripheral part of the pump shell 20, and a ring gear 29 is fixed by welding to an outer peripheral part of the side cover 28. A drive plate (not illustrated) connected to an engine crankshaft is fastened to the ring gear 29, and rotational power is inputted from the engine to the pump impeller 5.

An output shaft 30 is spline joined to the turbine hub 13, the output shaft 30 transmitting rotational power from the engine, and an end part of the output shaft 30 is supported via a bearing bush 31 on a bottomed cylindrical support tube portion 28a integral with a center part of the side cover 28. A thrust bearing 32 is disposed between the turbine hub 13 and the side cover 28.

A clutch chamber 33 communicating with the circulation circuit 9 is formed between the side cover 28 and the turbine shell 10, and a lockup clutch 34 is housed within the clutch chamber 33, the lockup clutch 34 being capable of providing direct coupling between the turbine runner 6 and the side cover 28.

The lockup clutch 34 has a clutch piston 35 that is capable of being frictionally connected to the side cover 28 and can switch between a connected state in which the clutch piston 35 is frictionally connected to the side cover 28 and a non-connected state in which the frictional connection is released, a damper mechanism 36 being provided between the clutch piston 35 and the turbine shell 10. This damper mechanism 36 includes a damper spring 37 retained at a plurality of locations spaced in the peripheral direction of the clutch piston 35, a plurality of retainers 38 fixed to the clutch piston 35 so as to abut against one end part of the damper spring 37, and a plurality of spring-holding arms 39 welded to the turbine shell 10 so as to sandwich the damper spring 37 between themselves and the retainer 38.

The stator 7 has a stator hub 40 disposed between the pump hub 26 and the turbine hub 13, a plurality of stator blades 41 provided on the outer periphery of the stator hub 40, and a ring-shaped stator core 42 linking the outer periphery of the stator blades 41, a thrust bearing 43 being disposed between the pump hub 26 and the stator hub 40 and a thrust bearing 44 being disposed between the turbine hub 13 and the stator hub 40.

A one-way clutch 45 is disposed between the stator hub 40 and a stator shaft 50 relatively rotatably surrounding the output shaft 30, which rotates together with the turbine hub 13, the one-way clutch 45 being formed by providing a clutch member 48 between an outer race 46 press fitted with the stator hub 40 and an inner race 47 spline joined to the stator shaft 50, and the stator shaft 50 being non-rotatably supported on a transmission case (not illustrated).

Among the pump impeller 5 and the turbine runner 6, a balance weight chip 51 is welded to an impeller that requires it in order to be in balance, and in this embodiment a balance weight chip 51 is welded to for example the turbine runner 6.

Figure 3:
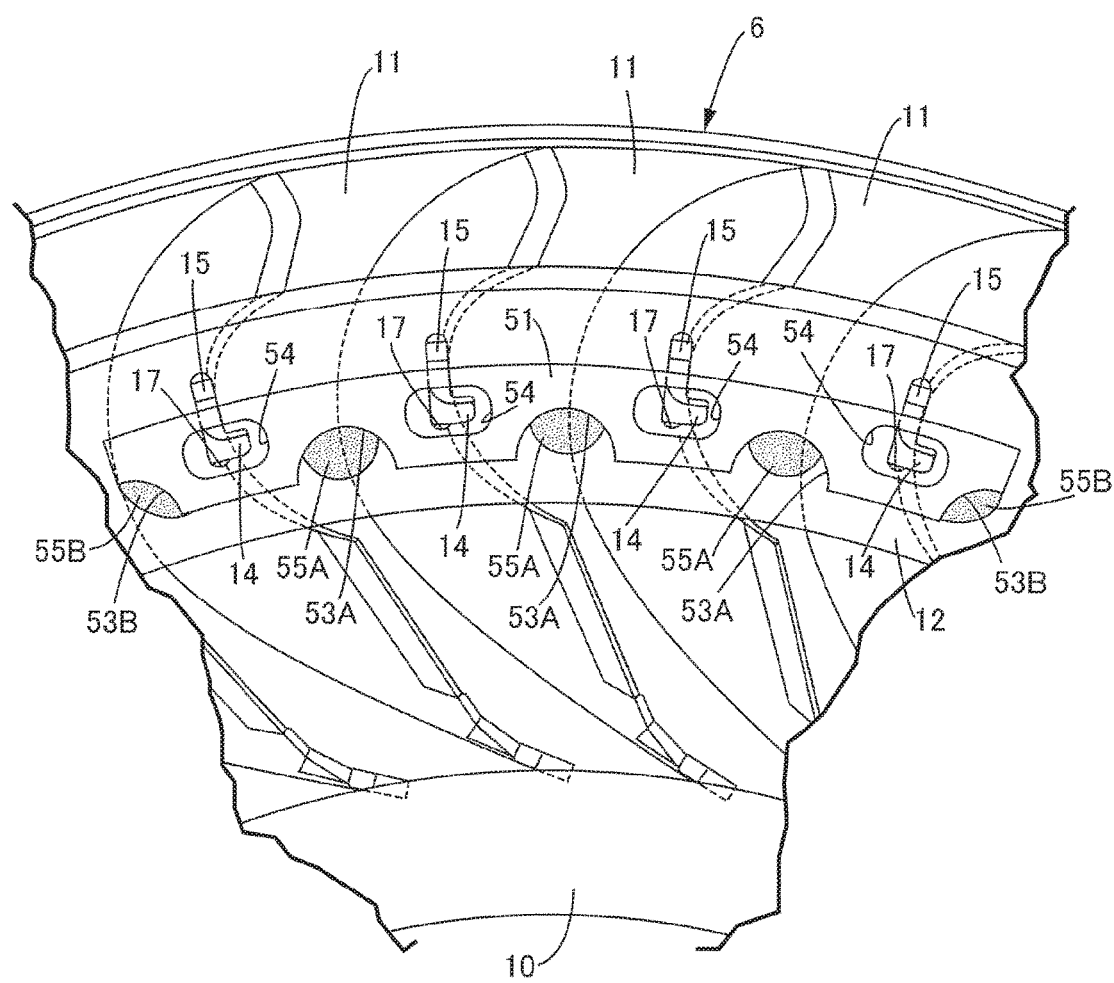
FIG. 3 is a view in a direction of arrow 3 in FIG. 2.

Referring in addition to FIG. 3, the balance weight chip 51 is formed so as to extend in the peripheral direction of the turbine core 12 while having a projecting piece-avoiding hole 54 at a plurality of locations, for example four locations, spaced in for example the peripheral direction of the turbine core 12, a portion, projecting from the latching hole 17, of the longer projecting piece 14 of the projecting pieces 14 and 15 projectingly provided as a pair at the inner ends of the plurality of turbine blades 11 extending through the projecting piece-avoiding hole 54, and the balance weight chip 51 being welded to the turbine core 12 so that the whole of the balance weight chip 51 is in intimate contact with the turbine core 12. In other words, the balance weight chip 51 is arranged in the peripheral direction of the turbine core 12 and welded to the turbine core 12 so that a portion of the balance weight chip 51 facing the turbine core in its entirety is in intimate contact with the turbine core 12.

A plurality of cutouts 53A and 53B disposed so as to correspond to positions between the plurality of projecting piece-avoiding holes 54 are provided in an inner peripheral part or an outer peripheral part of the balance weight chip 51, in this embodiment the inner peripheral part, and the balance weight chip 51 is welded to the turbine core 12 so that welded parts 55A and 55B are disposed within the cutouts 53A and 53B.

Moreover, the balance weight chip 51 is provided with three or more cutouts 53A and 53B, including specific cutouts 53B disposed at opposite ends in the longitudinal direction of the balance weight chip 51; among the cutouts 53A and 53B the cutouts 53A other than the specific cutouts 53B are formed into a semicircular shape, and the specific cutouts 53B are formed into a ¼ circle shape.

Figure 4:
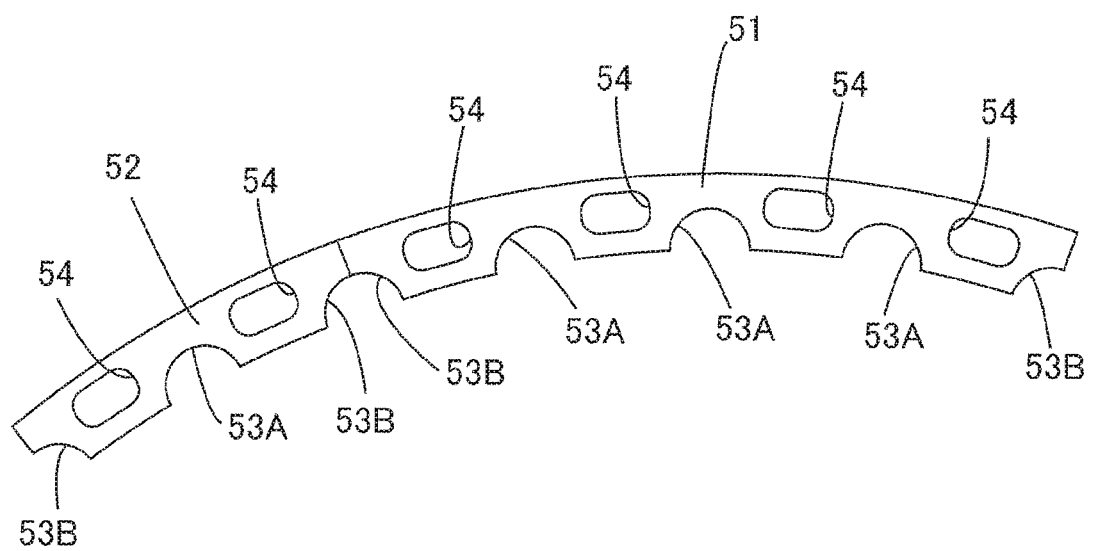
FIG. 4 is a view showing a state in which two balance weight chips are arranged.

In order for the turbine runner 6 to be in balance, a plurality of balance weight chips may be prepared in advance; as shown in FIG. 4, other than the balance weight chip 51 having four projecting piece-avoiding holes 54 a balance weight chip 52 having two projecting piece-avoiding holes 54 may be prepared, and apart from the balance weight chips 51 and 52 being used on their own the balance weight chips 51 and 52 may be used by being arranged side by side. In this case, the specific cutouts 53B disposed at ends in the longitudinal direction of the adjacent balance weight chips 51 and 52 form a semicircular shape in cooperation.

The operation of this embodiment is now explained; the plurality of latching holes 17, with which the projecting piece 14 projectingly provided at the inner end of the turbine blade 11 are latched, are provided in the turbine core 12 brazed to the inner end of the turbine blade 11 so as to form, together with the bowl-shaped turbine shell 10 and the plurality of turbine blades 11, the turbine runner 6, the turbine blades 11 being arranged in the peripheral direction of the turbine shell 10 and fixed to the inner peripheral face of the turbine shell 10, the balance weight chips 51 and 52 are welded to the turbine core 12, and the balance weight chips 51 and 52 having the projecting piece-avoiding hole 54 through which the portion, projecting from the latching hole 17, of the projecting piece 14 extends are welded to the turbine core 12 so that the whole of the balance weight chips 51 and 52 is in intimate contact with the turbine core 12. Therefore, a small size for the torque converter can be achieved by enabling the balance weight chips 51 and 52 to be welded to the turbine core 12 while preventing a gap from being formed between themselves and the turbine core 12 and, furthermore, due to the portion, projecting from the latching hole 17, of the projecting piece 14 extending through the projecting piece-avoiding hole 54 it becomes possible to carry out reliable positioning of the balance weight chips 51 and 52 with respect to the turbine core 12, thus preventing the balance weight chips 51 and 52 from interfering with another component.

Furthermore, since the plurality of cutouts 53A and 53B disposed so as to correspond to positions between the plurality of projecting piece-avoiding holes 54 are provided in the inner peripheral parts of the balance weight chips 51 and 52 extending in the peripheral direction of the turbine core 12 while having the plurality of projecting piece-avoiding holes 54, and the balance weight chips 51 and 52 are welded to the turbine core 12 so that welded parts 55A and 55B are disposed within the cutouts 53A and 53B, it is possible to minimize the space above the turbine core 12 necessary for disposing the balance weight chips 51 and 52 by preventing the welded parts 55A and 55B from protruding outside in the width direction of the balance weight chips 51 and 52.

Moreover, since, among the three or more cutouts 53A and 53B provided in the balance weight chips 51 and 52 including the specific cutout 53B disposed at opposite ends in the longitudinal direction of the balance weight chips 51 and 52, the cutout 53A other than the specific cutout 53B is formed into a semicircular shape, and the specific cutout 53B is formed into a ¼ circle shape so as to form a semicircular shape in cooperation with the specific cutout 53B of other balance weight chips 51 and 52, it is possible to weld end parts of adjacent balance weight chips 51 and 52 to each other at the same time, thus decreasing the number of welding positions.

An embodiment of the present invention is explained above, but the present invention is not limited to the above-mentioned embodiment and may be modified in a variety of ways as long as the modifications do not depart from the gist of the present invention.

For example, in the above embodiment, a case in which the balance weight chips 51 and 52 are welded to the turbine runner 6 is explained, but the present invention may be applied to a case in which the balance weight chips 51 and 52 are welded to the pump impeller 5. Furthermore, the present invention may be applied to a hydraulic coupling having no stator 7.

What is claimed is:

1. A fluid transmission device comprising
a bowl-shaped shell,
a plurality of blades that are arranged along a peripheral direction of the shell and fixed to an inner peripheral face of the shell, and
a core that is fixed to an inner end of the blade so as to form, together with the shell and the blades, an impeller, the core comprising a plurality of latching holes with which a projecting piece projectingly provided at the inner end of the blade is latched and comprising a balance weight chip welded to the core,
wherein the balance weight chip comprises a projecting piece-avoiding hole through which a portion, projecting from the latching hole, of the projecting piece extends, the balance weight chip being welded to the core such that a portion of the balance weight chip facing the core in its entirety is in intimate contact with the core, and
wherein an inner peripheral part or an outer peripheral part of the balance weight chip having a plurality of the projecting piece-avoiding holes and extending in a peripheral direction of the core comprises a plurality of cutouts disposed so as to correspond to positions between the plurality of projecting piece-avoiding holes, and the balance weight chip is welded to the core so that a welded part is disposed within the cutout.

2. The fluid transmission device according to claim 1, wherein among three or more of the cutouts provided in the balance weight chip, including specific cutouts disposed at opposite ends in a longitudinal direction of the balance weight chip, a cutout other than the specific cutout is formed into a semicircular shape, and the specific cutout is formed into a ¼ circle shape so as to form a semicircular shape in cooperation with the specific cutout of another balance weight chip.

* * * * *